US007251607B1

(12) United States Patent
Veschi

(10) Patent No.: US 7,251,607 B1
(45) Date of Patent: Jul. 31, 2007

(54) DISPUTE RESOLUTION METHOD

(76) Inventor: John Peter Veschi, 8468 Oak Knoll St., Fogelsville, PA (US) 18051

( * ) Notice: Subject to any disclaimer, the term of this patent is extended or adjusted under 35 U.S.C. 154(b) by 0 days.

(21) Appl. No.: 09/507,062

(22) Filed: Feb. 18, 2000

Related U.S. Application Data

(60) Provisional application No. 60/142,641, filed on Jul. 6, 1999.

(51) Int. Cl.
  *G06Q 99/00* (2006.01)
(52) U.S. Cl. ...................................................... 705/1
(58) Field of Classification Search .................... 705/1, 705/80, 14
  See application file for complete search history.

(56) References Cited

U.S. PATENT DOCUMENTS

| | | | | |
|---|---|---|---|---|
| 5,495,412 | A * | 2/1996 | Thiessen | 345/751 |
| 5,793,365 | A * | 8/1998 | Tang et al. | 715/758 |
| 5,895,450 | A * | 4/1999 | Sloo | 345/751 |
| 5,904,485 | A * | 5/1999 | Siefert | 434/236 |
| 5,933,811 | A * | 8/1999 | Angles et al. | 705/14 |
| 6,009,410 | A * | 12/1999 | LeMole et al. | 705/14 |
| 6,029,195 | A * | 2/2000 | Herz | 725/116 |
| 6,112,189 | A * | 8/2000 | Rickard et al. | 705/36 |
| 6,131,085 | A * | 10/2000 | Rossides | 705/1 |
| 6,175,833 | B1 * | 1/2001 | West et al. | 434/323 |
| 6,247,047 | B1 * | 6/2001 | Wolff | 705/14 |
| 6,308,202 | B1 * | 10/2001 | Cohn et al. | 709/217 |
| 6,330,551 | B1 * | 12/2001 | Burchetta et al. | 705/37 |
| 6,571,234 | B1 * | 5/2003 | Knight et al. | 707/3 |

FOREIGN PATENT DOCUMENTS

EP  1061465 A2 * 12/2000

OTHER PUBLICATIONS

Eisen, Joel B, "Are we ready for mediation in cyberspace?" Brigham Young University Law Review, v1998n4, pp. 1305-1358, 1998.*
www.facilitate.com.*
www.eshare.com, Retrieved from the Internet Archive WayBack Machine <www.archive.org>, Date range: Apr. 27, 1999-May 8, 1999.*

(Continued)

*Primary Examiner*—Jonathan Ouellette

(57) ABSTRACT

In a first embodiment according to the invention, a method of resolving a dispute includes the step of at least one of a plurality of parties to the dispute providing, via an on-line connection, an input relating to the dispute. Information related to resolution of the dispute is provided, via the on-line connection, to at least one of the parties. The method may further include the step of providing at least a portion of the input from the at least one party in a publicly accessible on-line form that may include an advertising field. In one embodiment, the advertising may be related to the dispute. In one alternative, the method allows at least some people who access the on-line form to interact therewith, such as by voting on the outcome or querying the parties. This method may further include a step of determining which people that access the on-line form are permitted to interact therewith, based, for example, on an assessment of the person's knowledge of the law and/or the facts.

24 Claims, 10 Drawing Sheets

OTHER PUBLICATIONS

"NevadaBusiness.com to Host Online Mayorable Debate." Business Wire Apr. 26. 1999.*

"ZipLink: Clinton, Dole take off gloves in Cyberspace; Presidential debate broadcasts live for the first time on the Internet." Business Wire, Oct 1, 1996.*

"Virtual Meetings Now Offer Functionality," Interactive PR, Jun. 17, 1996.*

Tyler, Melissa Conley, "115 and Counting: The State of ODR 2004," International Conflict Resolution Centre, University of Melbourne.*

* cited by examiner

FIG. 7

STATUS BOARD

| LOCATION | DISPUTE | PARTIES | TYPE | STATUS | ESTIMATED TIME REMAINING | GALLERY | WAIT LIST |
|---|---|---|---|---|---|---|---|
| CHAMBER 1 | 00-PR-96 | HELENE v. ANTHONY | PROPERTY | ACTIVE | 18 MINS | FULL | CLOSED |
| CHAMBER 2 | 00-FA-117 | JANE v. TOM | FAMILY | ACTIVE | 29 MINS | FULL | 127 |
| CHAMBER 3 | 00-CO-76 | JOANNE v. JOHN | CONTRACT | ACTIVE | 43 MINS | FULL | 26 |
| CHAMBER 4 | 00-IN-86 | SUPERMAN v. JOKER | INJURY | 10 MINS TO START | 1 HOUR, 5 MINS | AVAILABLE | |
| CHAMBER 5 | 00-FA-118 | DAVE v. JENNIFER | FAMILY | 20 MINS TO START | ------ | AVAILABLE | |
| CHAMBER 1 | 00-CR-77 | JOE v. MIKE | CRIMINAL | 30 MINS TO START | ------ | FULL | 12 |

701

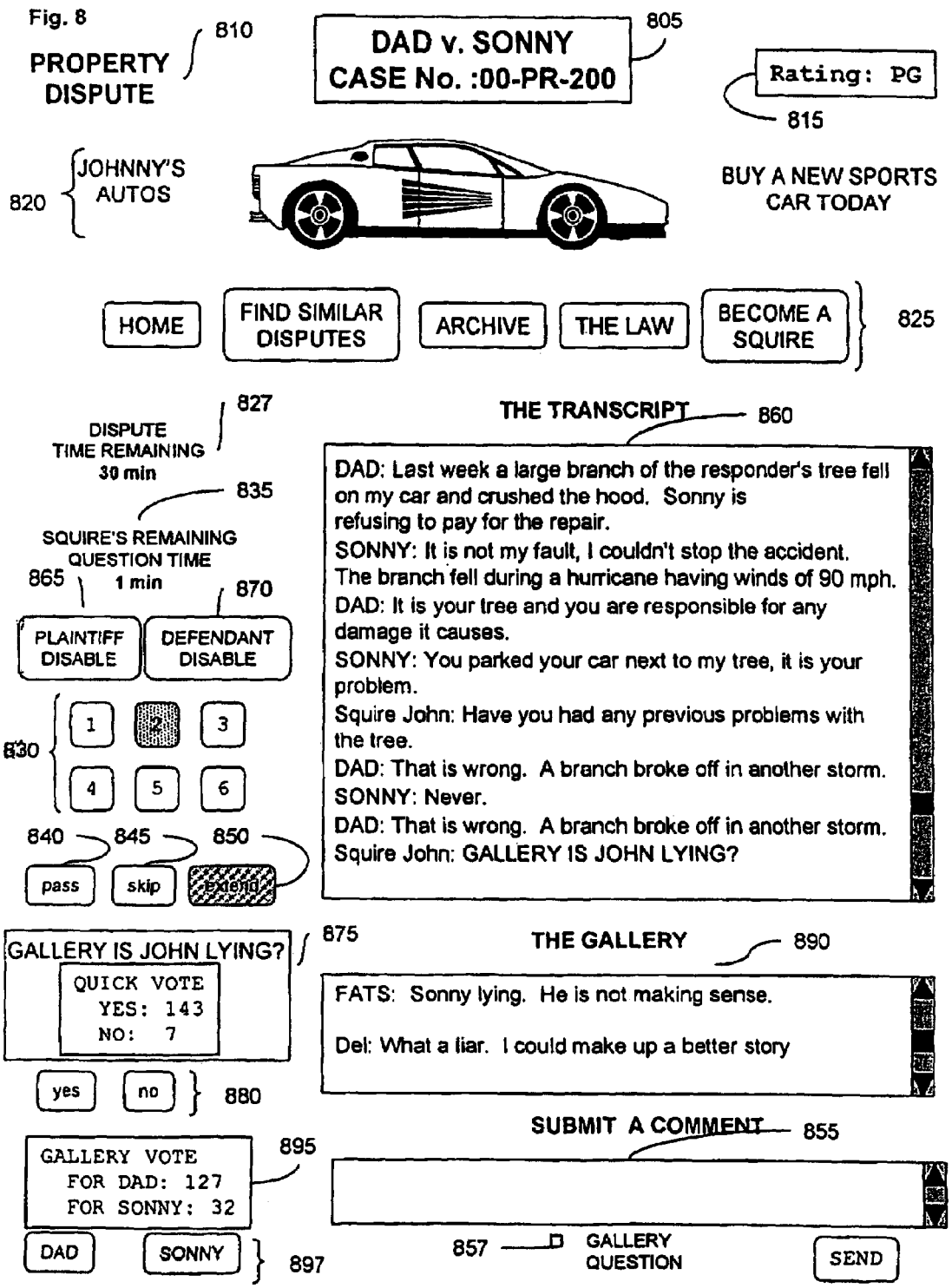

Fig. 9

PROPERTY DISPUTE

DAD v. SONNY
CASE No. :00-PR-200

Rating: PG

JOHNNY'S AUTOS

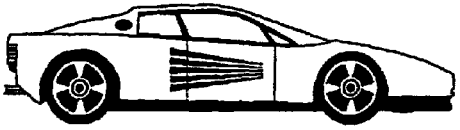

BUY A NEW SPORTS CAR TODAY

[ HOME ] [ FIND SIMILAR DISPUTES ] [ ARCHIVE ] [ THE LAW ] [ BECOME A SQUIRE ]

DISPUTE TIME REMAINING
3 min

THE TRANSCRIPT

DELIBERTING

RENT A WRECK FROM JOHNCO

SQUIRE'S REMAINING QUESTION TIME
0 min

[ PLAINTIFF DISABLE ] [ DEFENDANT DISABLE ]

[1] [2] [3]
[4] [5] [6]

[pass] [skip] [send]

THE GALLERY

QUICK VOTE
YES:
NO:

SUBMIT A COMMENT

[ SEND ]

GALLERY VOTE
FOR DAD: 389
FOR SONNY: 21

FIG. 10

| UNIQUE IDENTIFIER 1010 | STATUS 1015 | CURRENT GALLERY VOTE 1020 | QUICK VOTE 1025 | SQUIRE VOTE 1030 | SQUIRE PERIOD 1035 | PARTY DISABLED 1040 |
|---|---|---|---|---|---|---|
| XXX-001 | PLAINTIFF | - | - | - | - | NO |
| XXX-004 | SQUIRE | - | - | - | - | - |
| XXX-018 | SQUIRE | - | - | - | EXTEND | - |
| XXX-023 | GALLERY | PLAINTIFF | YES | - | - | YES |
| XXX-055 | DEFENDANT | - | - | - | - | - |
| XXX-007 | SQUIRE | - | - | - | SKIP | - |
| XXX-101 | GALLERY | PLAINTIFF | NO | - | - | - |
| XXX-201 | GALLEYR | PLAINTIFF | YES | - | - | - |
| XXX-123 | GALLERY | DEFENDANT | YES | - | - | - |
| XXX-555 | GALLERY | - | - | - | - | YES |
| XXX-347 | SQUIRE | - | - | - | - | - |
| XXX-111 | GALLERY | PLAINTIFF | NO | - | - | - |

DISPUTE RESOLUTION METHOD

PRIORITY CLAIM TO PROVISIONAL APPLICATION

This application claims priority to U.S. Provisional Patent Application 60/142,641, filed on Jul. 6, 1999, and incorporated herein by reference.

FIELD OF THE INVENTION

This invention is related to the field of dispute resolution, and in particular to an improved method of resolving disputes without the logistical overhead and cost associated with obtaining a lawyer and appearing in court. The invention is also related to the field of entertainment, as it provides a novel approach to dispute resolution that, while providing a vehicle for parties to a dispute to obtain resolution, also provides a vehicle for others to get involved in resolving the dispute or to be entertained.

BACKGROUND OF THE INVENTION

It is common knowledge that lawsuits are expensive, time-consuming, and nerve-wracking. For many people, being involved in a lawsuit is one of the worst experiences of their lives. It is often difficult to find a good lawyer, and often equally or more difficult to be able to afford to pay the lawyer. The legal process is complex and often overwhelming to those not educated in the law, and can include intimidating experiences, such as depositions and appearances as a witness in court.

Because of the logistical, emotional, and monetary expense associated with resolving a dispute via the legal system, many people try to resolve a dispute on their own, by coming to some form of agreement between the parties to the dispute. Alternatively, one party may simply learn to live with a problem, or modify his or her behavior, in an attempt to avoid a confrontation by suppressing the issue. This alternative may lead to poor emotional health, and may also lead to a disproportionate ultimate result as a "last straw" incident that causes the suppressing party to reach an anxiety threshold.

There is a need for a simplified dispute resolution method that allows for relatively fast and inexpensive resolution. Further, there is a need for a simplified process of educating parties to a dispute about the rules regarding their dispute—and about resolutions to similar disputes. Also, there is a constant need for educational, interactive, and/or enjoyable entertainment experiences, such as via the Internet.

SUMMARY OF THE INVENTION

In a first embodiment according to the invention, a method of resolving a dispute includes the step of at least one of a plurality of parties to the dispute providing, via an on-line connection, an input relating to the dispute. Information related to resolution of the dispute is provided, via the on-line connection, to at least one of the parties. The method may further include the step of providing at least a portion of the input from the at least one party in a publicly accessible on-line form that may include an advertising field. In one embodiment, the advertising may be related to the dispute.

In one alternative, the method allows at least some people who access the on-line form to interact therewith, such as by voting on the outcome or querying the parties. This method may further include a step of determining which people that access the on-line form are permitted to interact therewith, based, for example, on an assessment of the person's knowledge of the law and/or the facts.

In a further alternative embodiment, the method provides a dispute resolution process where one or more of the parties to the dispute, an audience viewing the dispute ("the gallery"), and the person adjudicating or resolving the dispute ("the resolver"), are remote from each other. The information necessary to resolve the dispute is provided via a communication medium to a dispute system that gathers, organizes, and provides the organized information to at least the parties, the gallery, or the resolver, via the communication medium. In a first variation of this embodiment, two or more of the parties to the dispute, the gallery, or the resolver are remote from each other. In a second variation of this embodiment, the resolver is remote from the dispute system. In a third variation of this embodiment, there are at least two resolvers each remote from the dispute system. The dispute system may be implemented in hardware or software or a combination thereof.

BRIEF DESCRIPTION OF THE DRAWINGS

Objects and advantages of the many embodiments of the invention will be apparent to one of ordinary skill in the art upon review of the following detailed description in light of the drawing, wherein:

FIG. 7 is an illustration of an alternative table presented to a user of a system according to the invention;

FIG. 8 is an illustrative interface for displaying information relative to the dispute according to an alternative embodiment of the invention;

FIG. 9 is an illustrative interface for displaying information relative to the dispute during deliberations regarding the outcome of the dispute shown in FIG. 8; and FIG. 10 is an illustrative data record stored in the dispute system for organizing information relative to the dispute.

DETAILED DESCRIPTION

Figure 1:
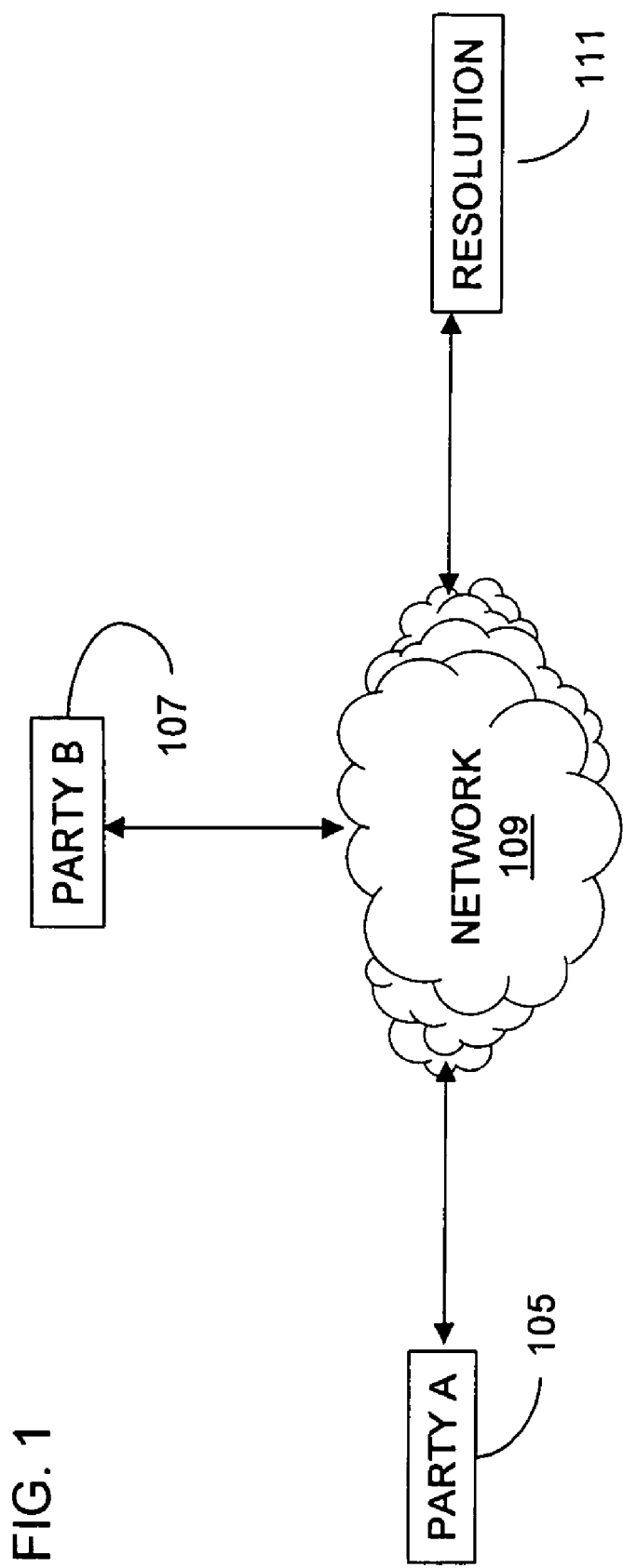
FIG. 1 is top level diagram of an exemplary dispute resolution system according to the invention.

In one embodiment, the invention comprises a web site, or other form of Internet or networked site, that is used for dispute resolution purposes. The site may provide a confidential dispute resolution service, for a fee, with the focus of the business model being that the fee is sufficiently low, and the fact that using the site eliminates the hassle of finding a lawyer and going to court, so that people may elect to turn to this site to resolve disputes. Physically, the invention thus comprises a computer system with a sophisticated web page and is collectively referred herein as the dispute system. The mechanics of creating and maintaining a web page are well known, and will not be described herein, given that once the method of the invention is understood, a proficient software engineer can readily create a web site to practice the methods of the invention.

In other words, the illustrative embodiment of the invention provides a process to resolve a dispute where one or more of the participants in resolving the dispute are remote from each other and communicate via a communication medium. The communication medium is coupled to a dispute system that gathers, organizes, and returns communications provided by the participants in an organized format to the participants via the communication medium.

The dispute resolver, according to this embodiment, may be, for example, an attorney, a retired judge, a law school professor, or a law school student. According to one model, a law school clinic comprises a professor and a plurality of students, wherein the students provide dispute resolution services, covering most of the routine issues, and turn to the professor, or to more senior students, for assistance in resolving more complex disputes. Thus, the students obtain training and exposure to real world issues. A variation of this model calls for a portion of a student's tuition to be paid for by a portion of the fee provided by the parties to the dispute.

In an alternative business model, the dispute resolution service is provided for free or for a very low fee, in exchange for the parties' willingness to make their dispute open to the public. Here, the business model depends on advertising revenue based on the view that many people would be interested in seeing what other people are arguing about. The resolver here may be the same as above (i.e., law students). Alternatively, people visiting the site may be permitted to interact therewith in order to ask questions of the parties or to vote on who should prevail in the dispute.

The ability to interact may be limited to certain visitors. For example, a person may only be allowed to interact (i.e., vote or ask questions) if the person has demonstrated sufficient knowledge of the relevant law, or of the facts of the present case. The web site according to the invention may thus be more sophisticated than most in that it includes the ability to keep track of votes, to insure that a person only votes once (or that if a person changes his/her vote, the previous vote is deleted) and the ability to confer voting status on particular individuals.

For example, a possible moniker for a person approved to vote and/or query the parties is "Squire™". To become a Squire (also known as an "E-Squire™"), in one embodiment, a person may be required to demonstrate proficiency in the relevant law. For example, presume a dispute involves next door neighbors, and one party has a tree that overhangs the property of the other, such that the dispute arose when the party that doesn't own the tree cut part of the tree (or built a fort in the tree, or hung a hammock from part of the tree, or attached a clothesline from part of the tree, or picked fruit from part of the tree, etc.). To be a Squire, a visitor to the site may be required to demonstrate sufficient knowledge of property law, such as the law of real property.

According to one business model, this proficiency is demonstrated by taking and passing a short multiple-choice question quiz. For example, the quiz may include 10 questions out of a universe of 500 real property questions. If the user answers at least a predetermined number correctly (e.g., 8 or 9), then the user is a Squire, and can now interact. If the user fails to answer the predetermined number correctly, the user may be permitted to take the quiz again (with another set of 10 questions, presumably randomly selected). However, the ability to take the quiz again may be deferred, either by user choice or by the choice of the dispute system, until the user has reviewed some basic information about the relevant law. This functionality may be implemented in the dispute system where the dispute system presents the questions to the user, receives the responses from the user, determines whether the user's questions are correct, and whether the user has answered sufficient ones of the questions correctly to become a Squire. The user communicates with the dispute system via the communication medium (e.g., the Internet)

The aforementioned cadre of law students may be valuable in this embodiment to develop the universe of questions associated with each area of law, as well as to create the tutorials reviewed by the aspiring Squires. Similarly, a quiz related to the facts of a dispute may be required in order to become a Squire, and may be created by one or more of the law students.

The various business models discussed above include different ways that a site according to the invention may be profitable. In the first embodiment, the site obtains revenue from the parties to the dispute. One model here is that each party puts up a fee, for example, $100.00, and provides the party's side of the story by, for example, completing an application form. Thus, the site receives $200.00 from the parties, pays a law student $25.00 to read the input and provide a decision, allocates much of the remaining money to maintain the site and advertise, etc., and realizes a profit from the remainder. This "parties pay" model may be modified to provide a "loser pays" embodiment; similar to the British model often recommended by law reform advocates. Here, each party may put a fee in escrow, such as $200.00, with the fee actually being charged only to the loser.

Although the above described exemplary fees may appear to be too high, they should be contrasted with the hassle and expense typically associated with hiring a lawyer and appearing in court. Given the alternatives, this service may be attractive to parties involved in a dispute who are simply looking for an impartial and educated third party to help them move on.

Alternatively, many people may be unwilling to pay, or may be unwilling to pay a lot, for the dispute resolution service, but would be very willing to have their dispute open to the public. According to this business model, the entertainment value of voyeuristically snooping in on other peoples' problems, and maybe even obtaining Squire status to be able to ask questions and/or vote, may be sufficiently alluring to enough users to attract advertising revenue. The advertisers may be attorneys looking to snag parties involved in similar disputes, or may be people who can provide a service related to the facts of the dispute. For example, a tree pruning service may have an advertisement that appears whenever there is a dispute involving parties in a particular geographic area, and the facts include a tree. Similarly, a marriage counselor may target family disputes for advertising, an automotive repair service may target disputes involving cars, a veterinarian may target disputes involving animals, etc. Of course, the advertising need not be related to the dispute, and may merely be provided by a company looking to get a message to the demographic group interested in visiting the dispute resolution site.

In this embodiment, the dispute system could include a database of keywords and advertisements to be displayed when those keywords are presented in a dispute. In addition, the dispute system could include information relative to the parties, the Squires, or the Gallery (those viewing the dispute) and selectively display advertisements based on that information. For example, if one of the parties mentions "tree" during the dispute and is located in zip code 19087, the dispute system determines which advertisements should be displayed when "tree" is mentioned and further narrows that list of advertisements to ones associated with the 19087 zip code. Therefore, an advertisement for a tree service located in the 19087 zip code may be transmitted from the dispute resolution system to the party that mentioned "tree".

Alternative revenue sources may include people visiting the site. For example, there may be a fee associated with becoming a Squire, or asking a question, or voting on the prevailing party. Further, some of these fees may be allocated to help a losing party to the dispute to compensate the winning party, or to appeal a decision that the losing party disagrees with. Accordingly, a visitor to the site may be afforded the opportunity to provide a donation for these purposes.

The site may provide links to chat rooms to allow people who have an interest in a dispute, or in a family of related disputes, to discuss the disputes, argue about who should prevail, argue about the state of the law, etc. In some embodiments, a chat room may be open only to Squires, for example, during deliberations (e.g. after the question and answer period, if any, has expired).

In one embodiment according to the invention, the site provides an archive of previous cases, organized in a meaningful way, so that parties to a new dispute can review any previous similar disputes, and, of course, be exposed to any related advertising.

Another useful link that may be provided by the site according to the invention is a legislative link. Here, for example, if a visitor to the site learns that the law in the visitor's state is different, for example, from the law in another state, or from some proposed or pending legislation, and the visitor wants to let the visitor's representatives know the visitor's preferences, the site can provide the visitor information regarding the visitor's representatives and links to the representatives. This may be provided, for example, based on a zip code of the visitor.

FIG. 1 is a top level view of one embodiment according to the invention. Here, party A is at location 105, such as a computer in party A's house or office, and party B is at location 107, such as a computer in party B's house or office. It is also possible for parties A and B to be at the same location. It is also possible for there to be more than two parties, or on the other hand for there to be only one party seeking an advisory opinion. It is also possible for the number of parties to change during a dispute resolution process, such as if a first party starts the dispute resolution process and another party joins in while the process is on going. Network 109 couples the parties to a resolution element 111. Network 109 is a communication medium such as the Internet, wired or wireless communication mediums, the telephone system, broadcast networks, cable, a combination of the aforementioned examples, etc.

Resolution element 111, according to one embodiment, is an attorney, counselor, law student, social worker, or other form of professional or credentialed individual who can help the parties resolve the dispute. For example, such an individual may ask questions of the parties, may come to a conclusion regarding the dispute and inform the parties of the conclusion. Such an individual may also provide information to the parties, such as in the form of links to relevant statutes, tutorials, case summaries, etc. to help the parties better understand the underlying law related to their dispute. Although the activities described above are described as being carried out by "an individual," it is also possible for multiple individuals to participate as the resolution element, or for some of the tasks of the resolution element, such as the links to the relevant information, to be carried out automatically, such as by a computer.

In another embodiment, resolution element 111 comprises one or more "Squires". The Squires may be "regular" people who have been elevated to Squire status, for example, by demonstrating some proficiency or knowledge of the relevant law or facts. The Squires may be located at various locations throughout the world, interconnected to the network 109, and connected to a dispute system via the network 109.

Figure 2:
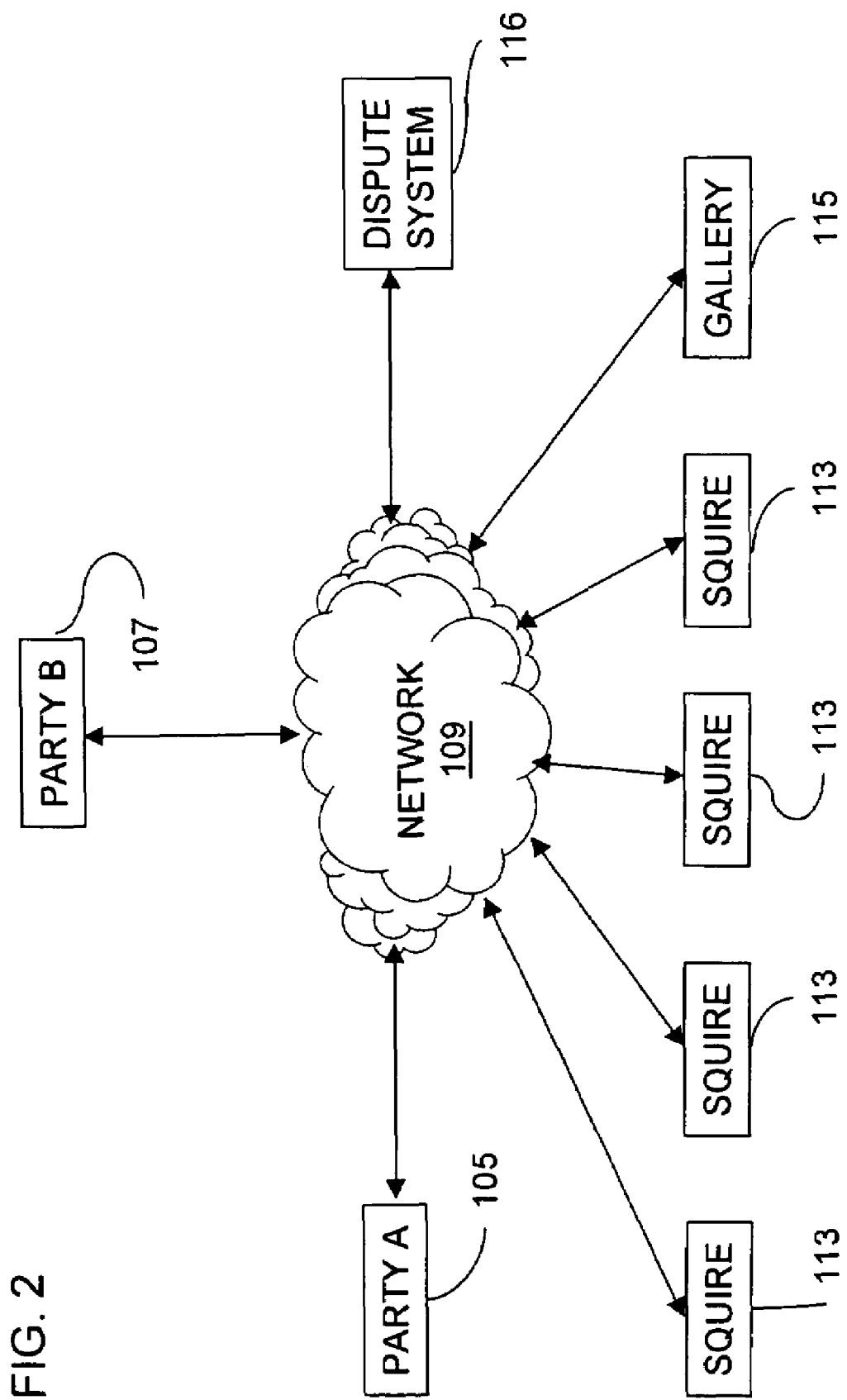
FIG. 2 is another top level diagram of an alternative dispute resolution system according to the invention.

FIG. 2 provides an exemplary embodiment wherein network 109 connects a dispute system 116 to the parties and to a plurality of Squires 113. The number of Squires connected may be set at any level, depending on the number of available Squires, the number of disputes to be resolved and the capabilities of the dispute system 116 to keep track of the activity.

Also, one or more visitors or observers, collectively referred to as the "gallery" 115, may be coupled to the dispute system 116 via the network 109. Each member of The gallery may, for example, be logged in to the dispute system 116 via the network 109 from a different location, such as the gallery member's home or office. The gallery members may also have the ability to interact, but the interaction of a gallery member may be different from that of a Squire. For example, the gallery members may be permitted to chat amongst themselves, to provide suggestions to the Squires, to vote on whom should be the prevailing party, etc. However, the activities of the gallery members may be kept track of separately from those of the Squires, and corresponding information may be provided to the parties, the Squires and the gallery members.

Figure 3:
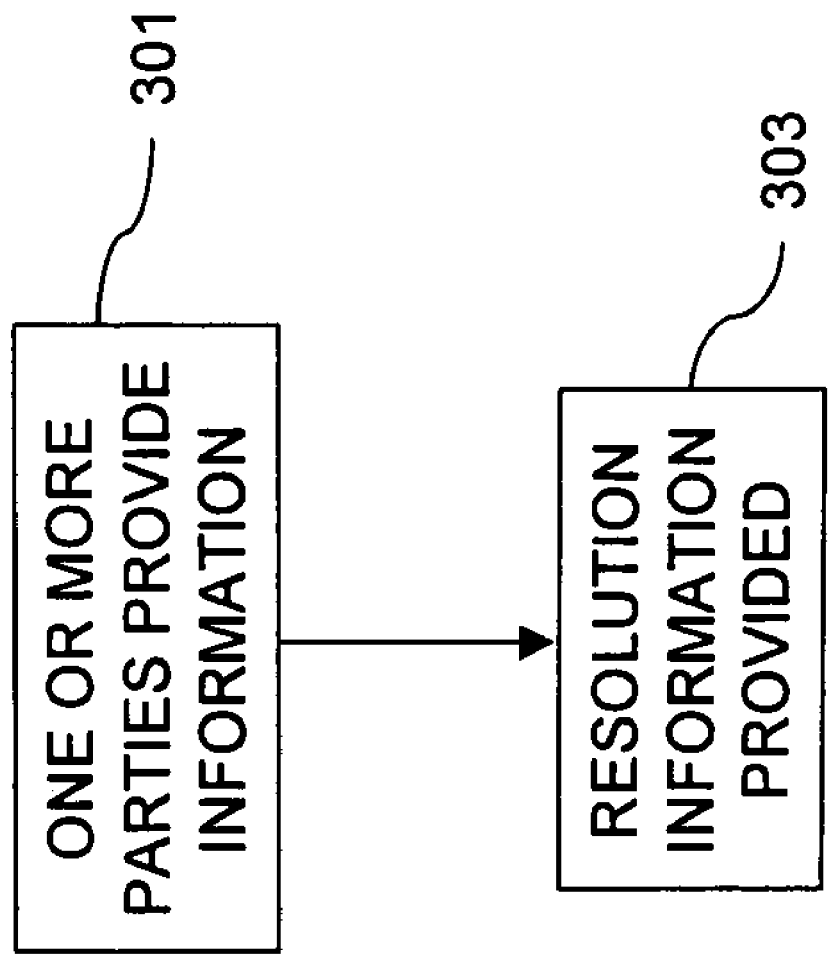
FIG. 3 is a simplified operational flowchart according to one embodiment according to the invention.

FIG. 3 provides an operational flowchart according to one embodiment of the invention. At step 301, one or more parties provide information, and at step 303 resolution information is provided. The information provided at step 301, as at any step in any of the embodiments according to the invention, may be text, audio, video, or any combination thereof. In a simple example, the information provided at step 301 comprises at least one party filling in a form that is provided to that party by the dispute system 116 via the network 109. This form is completed to the best of the party's ability and submitted to the dispute system 116 via the network 109. This submission step may include the submission of a fee, such as by credit card information or other forms of e-cash. The resolution information may include legal information, such as a most likely result if the party pursued the case in the legal system, may include links to relevant statutes, case law and/or tutorials. The resolution information may be provided by an individual or automatically by, for example, the dispute resolution system.

Figure 4:
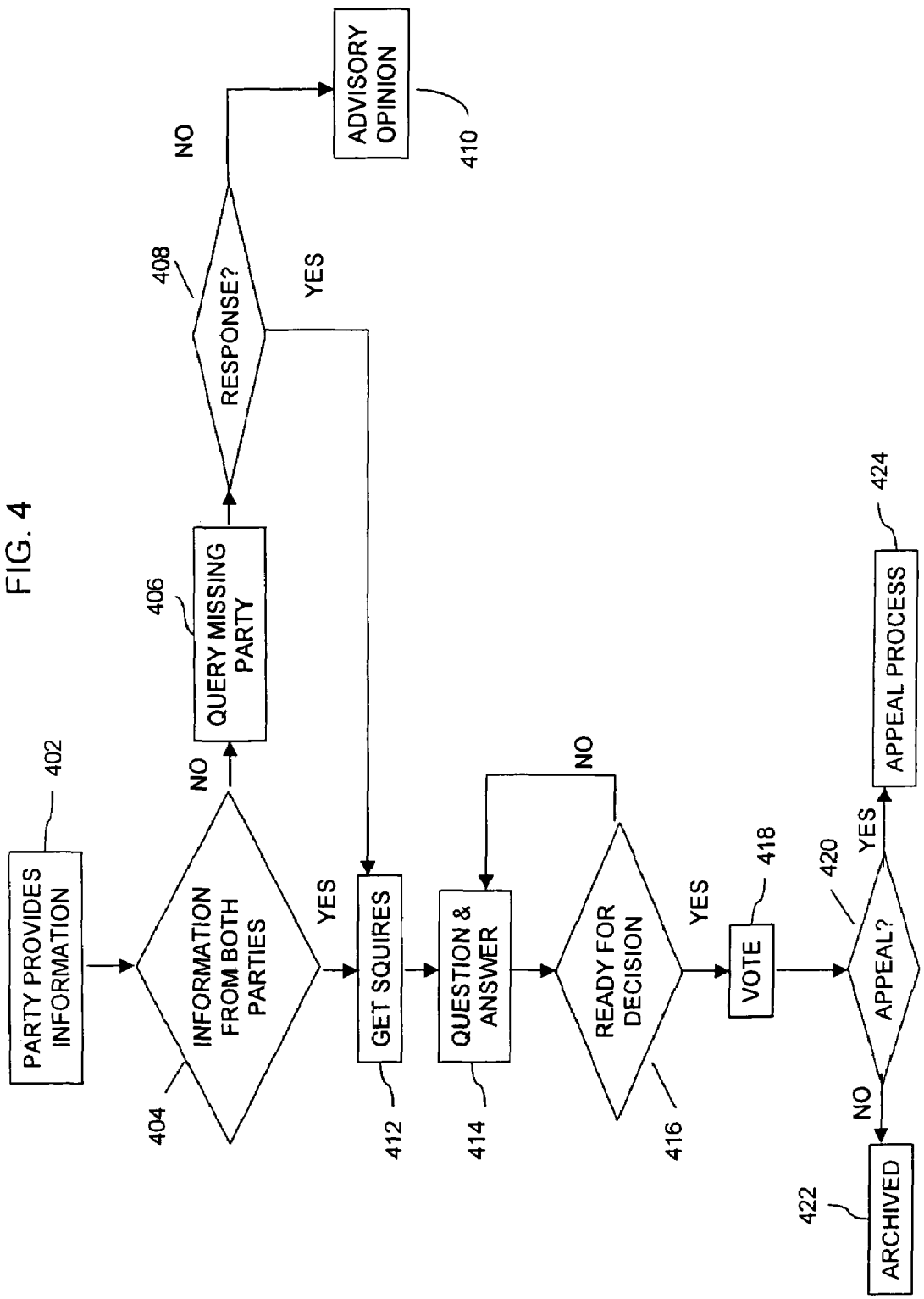
FIG. 4 is another simplified operational flowchart according to another embodiment according to the invention.

FIG. 4 provides an alternative flowchart according to the invention. Here, at step 402 a party to the dispute provides information regarding the dispute, such as by filling in an initial complaint form. At step 404, the dispute system determines if the information provided includes information from both or all parties to the dispute. For example, the complaint form filled in by the party in step 402 may include a section to be filled in by each party, and the determination at step 404 is whether all of the sections have been filled in. If the answer is no, then a query is issued to the missing party or parties at step 406 by, for example, the dispute system. For example, if one party submits at step 402, the submitting party may provide identification information, such as an email address, of the other party or parties, and the query at step 406 may comprise an email to the other party or parties informing them of the commenced dispute and providing instructions or a link for the other parties to join in. Alternatively, or additionally, the query may be to the party that submitted in step 402, seeking that party's help in motivating the missing party to participate.

At step 408 a determination is made as to whether all of the parties have responded to the query. This determination may be made by the dispute system. This determination can be made, for example, based on a temporal threshold. For example, the query at step 406 may give the missing party or parties a certain amount of time to respond, such as one hour, eight hours, one day, two days, etc. When the selected amount of time has passed and the missing party or parties have not elected to participate, the decision at step 408 is to proceed to step 410 and offer an advisory opinion. If, on the other hand, the parties are all electing to participate, then at step 412 the Squires are assigned and the dispute proceeds. There are various alternative mechanisms for selecting and assigning the Squires, and these will be discussed in more detail below. One or more of the steps shown FIG. 4 may be performed by the dispute system 116.

The dispute may unfold in many alternative ways, one of which is for the Squires to ask questions of the parties and the parties to provide responses to these questions. This question and answer process is depicted as step 414. The process of step 414 may take many forms. For example, in one embodiment, the Squires are allowed to question the parties in a free flowing format, wherein whichever Squire gets his or her question in first is the one whose question is displayed to the parties (and the Squires and gallery). After the queried party responds to the query, the other party or parties may be given an opportunity to reply, or the other Squires may be given an opportunity to ask another question. This format may be modified by stacking the Squire questions up in a queue and/or by limiting the ability of the non-queried parties to interrupt or contribute until queried directly.

Alternatively, each Squire may be provided an opportunity to ask one or more questions of the parties according to a token ring format. According to this approach, each of the assigned Squires is assigned a Squire number for this particular dispute. Thus, if there are six Squires assigned to the dispute, one will be Squire #1, one will be Squire #2, and so on. The Squires can then take turns asking questions, may be able to converse with each other regarding suggested questions, may be able to take suggestions from the gallery, etc.

The manner in which the Squires take turns may be controlled based on the number of questions or on the amount of time allotted to each Squire. For example, in one embodiment, Squire #1 gets to ask the first question. After Squire #1's question is answered, Squire #2 can ask a question. This will continue until each Squire has asked a question and received an answer. The process may be set up so that there is one such round of questions, at which point step 414 is complete. There may, instead, be multiple rounds of questions, such that after Squire #6 asks a question, the token passes to Squire #1, and this process continues until all of the Squires have completed asking their questions, indicated by each Squire "passing" when his or her turn arrives and the Squire has no further questions.

The questioning period may alternatively be controlled by giving each Squire a predetermined amount of time, such as ten minutes, to ask the parties as many questions as the Squire wishes to. According to this example, each Squire will enter into a dialog with one or more of the parties until either the Squire's time has run out or the Squire has run out of questions, at which time the next Squire will be given the token. This process may also be limited to just one round, or may be a multi-round process. Further, the time allotted to each Squire may change from round to round. For example, in the first round each Squire may get ten minutes, in the second round five, and in the third round two. Alternatively, each Squire may be permitted to save extra time not used from one round and add it to the Squire's allotted time for a future round. In this process, the dispute system 116 may store appropriate data to control the question and answer process 414. For example, the number of minutes allotted each Squire, which Squire is next to ask questions, whether a Squire has passed on questioning, etc. Of course, the question and answer period 414 may be a combination of these two methods, having some rounds controlled by time and others controlled by number of questions.

The "ready for decision" step 416 demonstrates the potential multi-round nature of the question and answer process. It is also possible to have the determination at step 416 be based on a consensus of the Squires. For example, if four of the six Squires want to have another round of questioning, then it will occur, and if not, then the answer at step 416 is YES and the process proceeds to step 418 where the Squires vote on which party should prevail.

After the vote at step 418, a determination may be made regarding whether to appeal at step 420. If there is no appeal, then the process proceeds to step 422 where some or all of the transcript of the dispute is placed in an archive. Alternatively, if the decision is to appeal, then the appeal process 424 is initiated. The decision to appeal at step 420 may be made by the losing party, perhaps by paying an appeal fee (depending on the selected appeal process). The appeal fee may also be provided by others, such as by members of the gallery. The decision to appeal may alternatively be automatic, such as if the Squires are deadlocked or close to deadlocked in their vote. For example, if there are six Squires, it could be established that a consensus among five of the six Squires is required, and if the Squires come out 4-2 then an appeal is automatically granted to the losing party, presumably for free. Similarly, if the decision is 3-3, then an appeal is automatically initiated (e.g., by the dispute system), although neither party is characterized as the "losing" and hence appealing party. Alternative appeal processes will be discussed in more detail below.

As mentioned earlier, there are alternative methods to select and/or assign the Squires as shown at step 412. One way to select the Squires is to select a time for the dispute to occur and send an email to all of the Squires in the subject area asking for volunteers. An alternative way is to send the email to a selected subset of the relevant Squires. A further way to select Squires is to identify which Squires are currently logged in or viewing information from the dispute system and determining if they are willing to participate in a dispute that will proceed immediately or within a specified period of time.

The subset may be selected, for example, in a random or pseudorandom fashion, or may be based on one or more criteria. Exemplary criteria include how many times an individual has served as a Squire, how long it has been since an individual has served as a Squire, information about the individual Squire such as days and times that are generally convenient for the individual, and how responsive the individual has been to previous Squire Calls. This information may be stored in a data record in the dispute system and accessed by the dispute system for processing. The dispute system may also query the Squires to determine their availability.

Figure 5:
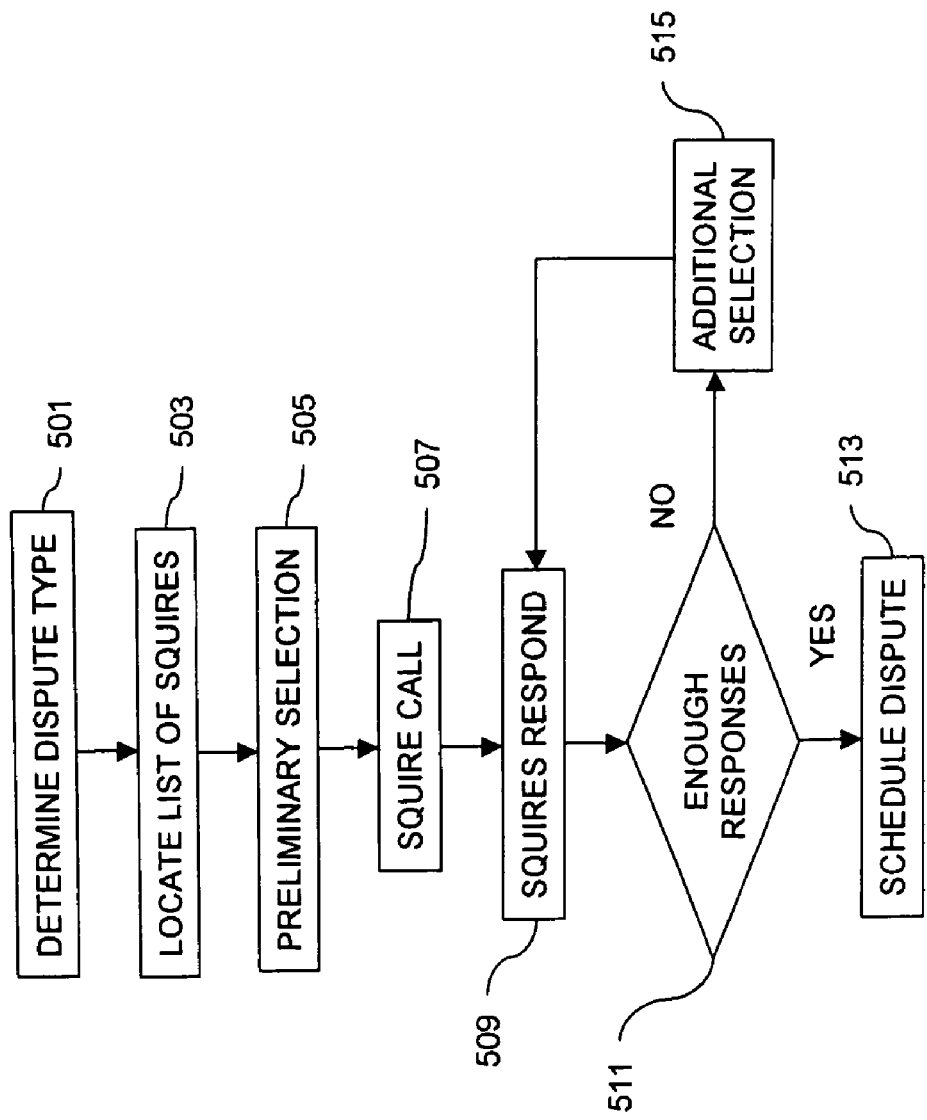
FIG. 5 is an operational flowchart providing an exemplary flow of one step within FIG. 4.

FIG. 5 shows an exemplary process for assigning the Squires. At step 501, the type of dispute is determined. At step 503, the list of Squires for this type of dispute is located. At step 505 a preliminary selection is made. This selection may begin with a target number of Squires, e.g., six, that are desired for the dispute. Given historical experience, it may be known that in order to end up with six Squires, at least "x" number of Squires should be initially selected. This historical experience may include knowledge regarding the type of dispute, the time of day, day of the week, etc. Thus, it may be known that for a contract dispute on Wednesday at 9:15 PM, an initial call to 17 Squires will yield a response from approximately six of them. This information may also vary based on calendar dates to account for particular holidays or for seasonal events. For example, it may be more difficult to have Squires available on Monday nights during football season than during other times of the year.

The preliminary selection may also be based on one or more of the aforementioned criteria. For example, it may be desirable to balance "new" Squires with experienced ones, and thus some of the Squires may be selected because they have a lot of experience, while others will be selected because they have little experience. Also, it may be desirable to try to equitably share the opportunity to be an active Squire amongst the members of the Squirearchy. Thus, how long it has been since a Squire was last active in resolving a dispute may be considered, with the priority going to those who have the longest time since the last active service. These criteria may be modulated with a "Squire Profile" indicating the best time for the individual Squire, such that the Squire will not be selected, even though it should be his or her turn, if the Squire's profile indicates they will not be available at the appointed time. Similarly, if the Squire has not been very responsive in the past, this information may be collected, and the Squire considered for removal from the Squirearchy.

In any event, the preliminary selection is made at step 505, and a Squire Call (email) is issued to the selected Squires at step 507. Steps 501, 503, and 505 may be performed by the dispute system. The Squires respond at step 509 indicating if they will be available at the appointed time. After a predetermined period of time, a determination is made at step 511 as to whether enough Squires are available. If so, then the dispute is scheduled at step 513, for example, by issuing an email to each of the parties and the Squires identifying the time, the location (i.e. chamber) at the site for the dispute if more than one dispute will be going on at a time, and providing a password for use in entering the chamber through the appropriate portal. If, on the other hand, the determination at step 511 is that there are not enough responses, then at step 515 an additional Squire selection occurs. This process continues until the appropriate number of Squires is confirmed. Steps 511, 513, and 515 may be performed by the dispute system.

Given the information regarding time, place and password, the parties and Squires subsequently check in at the appropriate portal of the appropriate chamber within a window of time prior to the initiation of the dispute resolution process. For example, if the dispute is set to be heard at 6:50 PM, the parties and Squires may be instructed to check in between 6:45 PM and 6:50 PM. When they are assembled, the questioning of the parties (step 414—FIG. 4) may commence. People may also view the dispute from the gallery.

Figure 6:
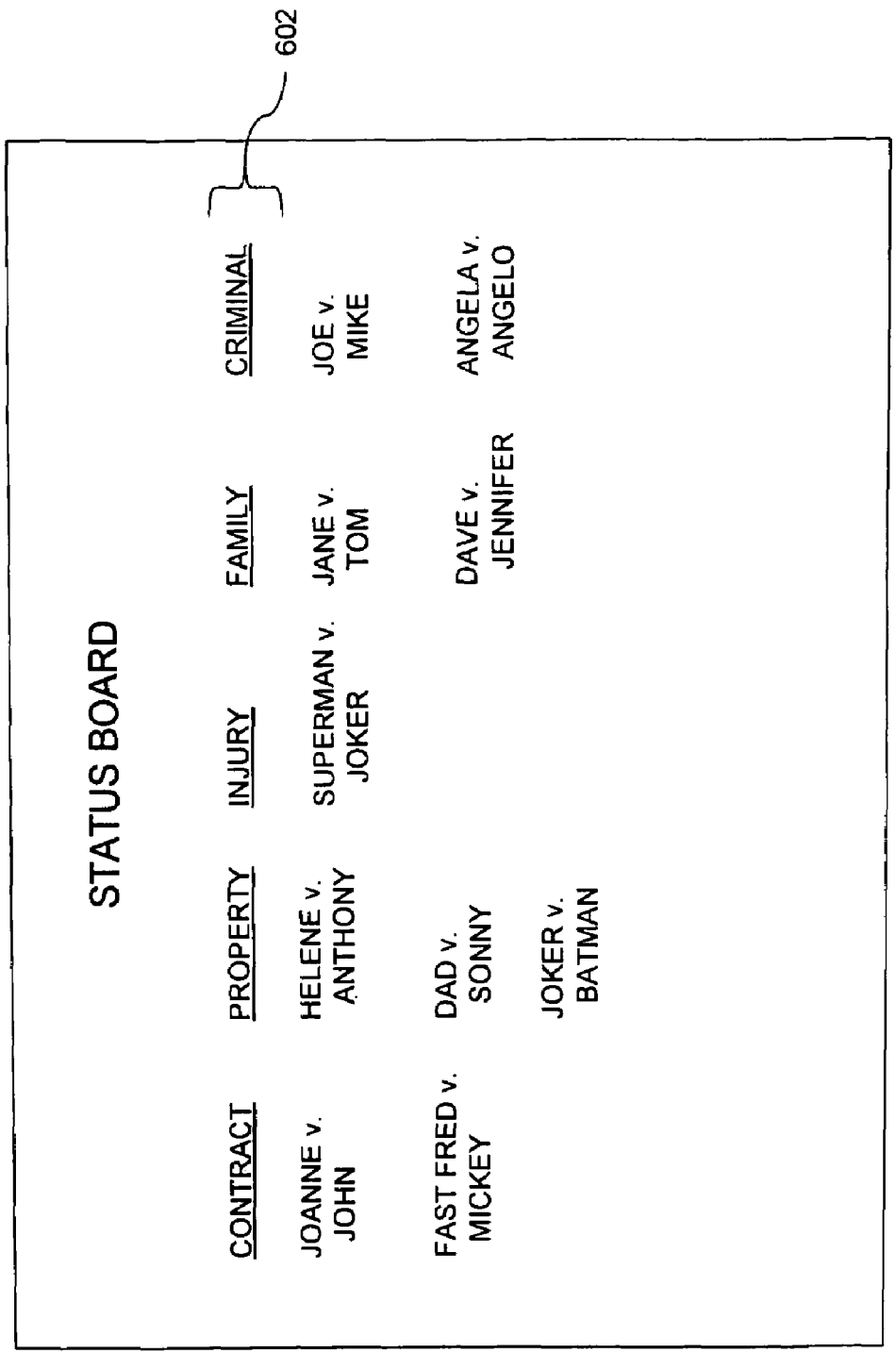
FIG. 6 is an illustration of a table presented to a user of a system according to the invention.

In one alternative embodiment, the disputes are scheduled so that one or more is always in process. Thus, for example, if one dispute is ending, a member of the gallery may be allowed to immediately enter another chamber to observe a dispute that is already in progress. To facilitate the movement of gallery members between disputes, a status board may be provided. An exemplary status board is shown in FIG. 6. This board may be linked to a button or icon so that it fills up a window of the display when the button is clicked, and is then minimized once the gallery member decides where to go. As shown in FIG. 6, the status board includes a heading row 602 that identifies the active or upcoming disputes by category. In the example of FIG. 6, the category headings include "Contract", "Property", "Injury", "Family", and "Criminal". These headings are, of course, merely by way of example and not of limitation. There may be many other categories, and the categories need not include the names illustrated in row 602.

Under each of the headings, one or more columns will provide information regarding one or more dispute. Some of this information may be linked to allow a gallery member to jump directly to the dispute. In the simplified example of FIG. 6, the only information under each heading is the "names" of the parties to the dispute, and also, optionally, an indication, based on the color of the names, as to the status of the dispute. For example, if the names are in one color (e.g. green) then it is known that the dispute is scheduled to begin in the next hour. If the names are another color (e.g. blue) then it is known that the dispute is now in progress and if the names are in a third color (e.g. red) then it is known that the dispute has recently been completed.

FIG. 7 shows an alternative type of status board. In this example, additional information is provided regarding each of the disputes, with each dispute being shown on one line of the chart. The exemplary headings in line 701 are "Location", "Dispute #", "Parties", "Type", "Status", "Estimated Time Remaining", "Gallery" and "Wait List". The exemplary entries in the table show that a gallery member can easily peruse the board and see which disputes are on going and which will be starting shortly. Also, the gallery member can see which disputes still have room ("available") and which are full. If a dispute is full, the gallery member can see how many others are on the waiting list, and can elect to add his/her name to the list. The threshold that makes a dispute be full or a waiting list be closed may be dictated by the technology (i.e., system capabilities) or may be arbitrarily set to promote retention.

As mentioned earlier, when a dispute is concluded an appeal process may occur, either for a fee or for free if the Squires were relatively split on the outcome. A free appeal may also be provided if the gallery for a dispute was particularly large and it is perceived as advantageous to keep the dispute going. The appeal process may look similar to the dispute process, except that the Squires selected to participate in the question and answer session may be at a higher level. For example, so called "Higher Squires" may be selected from the Squirearchy based on length of service, based on batting average (i.e., percent of the time the Squire voted with the majority of the other Squires hearing a dispute), based on an election amongst the Squirearchy, based on particular credentials (e.g., attorney, law student), based on a combination of these or based on other criteria. This information may be stored in a data record in the dispute system. If a reward is associative with serving as a Squire in a dispute, such as a fixed number of "Frequent Squire" points, the reward can be proportionately greater for Higher Squires. The "Frequent Squire" points may be points towards prizes, clothes, frequent flier miles, promotional items, etc. There may also be more than one level of appeal, such as to Higher Squires for one fee, and then to Supreme Squires for a different, presumably higher, fee.

When a Squire is active in a dispute, the Squire may like to ask the parties one or more regular or routine questions. To make it easier on the Squire, an individual question bank may be established. The Squire then need only identify the question, for example by alphanumerical designation, and the party the question is intended for, and the system will output the question to the intended party. A global question bank or set of sample questions may also be provided for use by the Squires.

The aforementioned process presumes that the flow of the hearing is predominantly in the form of questions and answers to the parties. It is, of course, also possible, but more complicated, to have questions directed to witnesses. Similarly, it is also possible to have parties or witnesses provide "evidence" in the form of particular types of files, such as word files, spreadsheets, JPEG files or WAV files. In one embodiment, these files are collected in a folder that is available for perusal by the assigned Squires before the dispute is active.

When a dispute is completed, it is archived for subsequent search. Thus, if a person is interested in researching an area of the law, in addition to looking at statutes or case law tutorials, the person can try to find a case that is similar to the one the person is interested in, and then review the transcript to see how one exemplary case played out. This is, of course, no guarantee to the person that a similar resolution would result in the person's case, as the law is different in each jurisdiction and no two fact patterns are identical.

When reviewing the archives, or at any other time, a person, party, Squire, etc. may come to the realization that a particular statute (state, federal or local) can be improved. The person can then use a service of the site to find the name and email address of the person's legislator, for example based on zip code, and can then send an email to the legislator providing input as to why the law should be changed. The person could also send email to his/her friends suggesting that they look up their legislators and send a similar message.

FIG. 8 is a screen view of an illustrative interface for resolution of a dispute. The interface includes an identifier 805 identifying the dispute by a party to the dispute and a unique identifier. Each dispute will have a unique identifier such as the identifier shown in FIG. 7 under dispute. In addition, the type of dispute 810 may be included. This may correspond to the dispute type shown in FIG. 6.

Each of the cases may be rated reflecting the subject matter of the dispute or in response to the language, graphics, or other materials that has been or will be presented during the dispute. For example, the subject matter of the dispute may be directed to a family matter between a husband and a wife where the dispute centers on one spouse's failure to participate in sexual relations with the other spouse. While this may be a matter that many married couples are interested in viewing, the content may be inappropriate for a person under a certain age. The rating 815 may be included on the interface.

In addition to providing information relating to the dispute, advertising information 820 may be included on the interface during the dispute. While the advertising information 820 is shown in the upper half of the screen, the advertising information 820 may be displayed in other areas of the interface or multiple advertisements may be placed on the interface. The advertising information may be modified on a periodic basis or in response to certain actions. For example, the advertising information 820 may be updated each time a Squire asks a question.

Further, links 825 to other sites or information may be provided. These could include links to similar disputes whether active or from an archive. In this case, a list of disputes (active and/or from an archive of past disputes) in the same category may be displayed. Alternatively, the listing of disputes could be identified using a search algorithm that identifies disputes to be listed by searching, for example, by party or key words or phrases from the current dispute.

A link to the law relating to the dispute may also be provided. This may include tutorials about the specific area of the law at issue, legislative materials, cases, news articles, law review articles, etc. A link may also be provided to become a Squire. The process of becoming a Squire is discussed above.

The interface is updated to reflect the interaction between the Squires and the parties by providing indicators of what is occurring during the dispute. First, a timer 827 indicating the approximate time remaining in the dispute may be provided. In addition, one or more indicators 830 may be provided to identify which Squire is addressing the parties or that it is a particular Squire's turn to ask questions. Illustratively, Squire 2 is highlighted indicating that it is Squire 2's turn to ask the parties one or more questions. The opportunity to ask questions may be passed from one Squire to another Squire after the first Squire asks a question or each Squire may be allowed a period of time to ask the parties a question or series of questions.

In the latter case, a timer 835 may be provided to indicate the time remaining for the Squire to ask questions. A timely resolution of the dispute may be achieved by limiting the Squires' time to ask questions. These two different methods may also be combined where the opportunity to ask questions passes from Squire to Squire and each Squire has a limited period of time to ask questions. In addition, a Squire may pass 840, skip 845, or extend 850 during their time to ask questions. If the Squire selects pass, a Squire's turn to ask questions is bypassed until the Squire turns off the pass 840.

If the Squire selects skip 845, the Squire skips her current turn but will automatically be given the opportunity to ask questions in a subsequent turn unless the she again selects skip 845 or pass 840. During a current turn to ask questions, a Squire may select to ask more questions of the parties by extending 850. The Squire may be granted an automatic extension or the other Squires may vote on whether to extend the Squire's turn. Alternatively, another Squire may pass his allotted time to ask questions to the Squire that is requesting the extension.

The transcript area 860 displays the interaction between each party and the Squires. The parties and the Squires submit information such as questions and answers via the entry block 855 that is subsequently displayed in the transcript area 860. In order to maintain control over the dispute, a Squire may limit one or more of the party's ability to respond to the Squire's question in order to allow the other party or a witness to respond to the Squire's question. In this case, Plaintiff disable 865 and Defendant disable 870 indicate whether one or both of the parties ability to respond to a question has been limited.

The Squires, parties, and gallery may view the same interface except that certain buttons will be activated or used to indicate what has been implemented by one of the people who can select those actions. For example, Squires may select pass 840, skip 845, or extend 850 to indicate that they are taking one of those actions whereas the interface for the parties and gallery reflects what the Squire has selected.

Similarly, the Squires may have the opportunity to limit a party's ability to respond by selecting Plaintiff Disable 865 and Defendant Disable 870, whereas the interface for the parties and the gallery display what has happened but do not provide the opportunity for the parties or the gallery to select those actions.

In addition, when a party or a Squire submits information via submission block 855, the submitted information is displayed in the transcript area 860. In the case of the gallery, submitted information via the submission block 855 is displayed in the gallery comment area 890. The dispute system maintains a database to track the parties, Squires, and gallery. When one of the parties, a Squire, or a person of the gallery submit information via the submission block, the dispute system determines who submitted the information and where is the appropriate position in the interface to display the submitted information, if at all. Once this has been done, the dispute system forwards information to refresh the interface for the Squires, parties, and the Gallery.

In addition to questions being directed to the parties, questions may be directed to the gallery by the Squires in gallery question section 875. In this case, a Squire would indicate, using a unique send button or select block 857, that the question is to be displayed in the gallery question section 875. The unique send button simply indicates to the dispute system that the question is directed to the gallery and that during the refresh operation the question is to be displayed in the gallery question section 875 instead of the transcript section 860. The gallery then may have an opportunity to vote by selecting NO or YES 880 or to comment via submission block 855 which is displayed in gallery comment area 890. The votes are tallied by the dispute system, which updates the interface during a refresh operation. This may be a running tally or a total tally after a specified period of time, for example, one or two minutes or thirty seconds. In this way, the Squires may obtain the gallery's opinion. This interaction between the Squires and the Gallery may be hidden from the parties.

In addition, the gallery may vote using send buttons 897 throughout the trial on their opinion of who should win in the dispute. The results of this vote may be displayed as a running tally 895. A person from the gallery may change their vote during the dispute. The dispute system may track the gallery's votes during this process. The dispute system maintains information to determine how each gallery member has voted to prevent a gallery member's votes from being counted twice or to reflect that one of the gallery members has changed their vote. For the latter case, for example, a gallery member may have voted for Sonny but has submitted a new vote for Dad. In this case, the dispute system subtracts a vote from Sonny's tally and adds a vote to Dad's tally.

FIG. 10 is an illustrative data record stored in the dispute system for organizing information relative to the dispute. The data record may include a unique identifier 1010 identifying the person and a status 1015 to indicate whether the person is a Squire, party, or Gallery member. Also included may be a person's current gallery vote 1020, the person's current quick vote 1025 to a Squire question 875, a Squire's vote 1030 as to the outcome of the dispute, the time allotted or the number of allotments 1035 remaining for the Squire to ask questions, and whether a party has been disabled 1040 from responding. Other information may be maintained in the data record.

FIG. 9 illustrates the interface of FIG. 8 during a deliberation period when the Squire's are in the process of deciding the dispute. At this point, an advertisement may be placed in the portion of the interface used for the transcript. This may be text, graphics, or streaming video. In the case of the streaming video, the deliberation of the Squires may be set at a minimum period of time to ensure that the streaming video has sufficient time to be completed. By using the transcript area, a larger amount of the interface area may be used for advertisement while not detracting from the dispute. Further, the additional advertisement may be used to entertain the gallery until the Squires decide the outcome of the dispute. Once the dispute is resolved, the decision of the Squires may be displayed in the transcript area or other area of the interface. In addition to, or in place of, the advertising, the gallery members may be offered the opportunity to play a game in the transcript area, while awaiting the decision. Alternatively, the transcript area may be established as a window through which a gallery member may conduct other activities, i.e., work on a spreadsheet, surf the internet, etc., while awaiting the decision, or at any other time during the dispute resolution process.

Based on an understanding of the foregoing examples and illustrations, obvious variations will suggest themselves to one of skill in the art. These variations are, of course, intended be covered within the scope of the invention, as recited in the following claims.

The invention claimed is:

1. A method of resolving a dispute, comprising:

at least one of a plurality of parties to the dispute providing, via an on-line connection, an input relating to the dispute;

information related to resolution of the dispute being provided, via the on-line connection, to at least one of the parties;

providing at least a portion of the input in a publicly accessible on-line form and allowing at least some people who access the on-line form to interact therewith in substantially real-time; and determining which people that access the on-line form are permitted to interact therewith based on an assessment of at least one of the person's knowledge of the law and the person's knowledge of the facts, wherein the determining step includes assessing the person's knowledge by providing the person a set of one or more questions and evaluating the person's responses to the questions, wherein the person is provided another set of questions from the larger set of questions if the person does not answer a predetermined number of the questions correctly, and wherein the dispute is resolved based at least in part on input from the person.

2. A method as recited in claim 1, further comprising the step of providing educational information to the person prior to providing the another set of questions.

3. A method of resolving a dispute, comprising:

at least one of a plurality of parties to the dispute providing, via an on-line connection, an input relating to the dispute; and interaction directed towards resolving the dispute occurring in substantially real-time between at least one of the parties to the dispute and another person, wherein the substantial real-time interaction is displayed on at least a display and wherein the dispute is resolved based at least in part on the interaction.

4. A method as recited in claim 3, wherein the other person is a juror.

5. A method as recited in claim 3, wherein the other person is a third party other than one of the parties to the dispute.

6. A method as recited in claim 5, further comprising the step of enabling another third party to view the dispute without enabling the other third party to interact with the parties.

7. A method as recited in claim 3, wherein the interaction comprises a question directed to the at least one of the parties.

8. A method as recited in claim 3, wherein the interaction comprises a vote on which party should prevail.

9. A method as recited in claim 3, wherein the input is in written form.

10. A method as recited in claim 6, further comprising the step of enabling the third party to interact based on an assessment of the third party's knowledge of the law.

11. A method as recited in claim 6, further comprising the step of enabling the third party to interact based on an assessment of the third party's knowledge of the facts.

12. A method as recited in claim 3, further comprising the step of providing, via the on-line connection, information related to resolution of the dispute to at least one of the parties.

13. A method as recited in claim 3 wherein a computer based system manages the interaction between the parties.

14. A method as recited in claim 3, wherein the input is related to real life facts.

15. A method of resolving a dispute as recited in claim 3, wherein the display includes a dispute related advertising field.

16. A method as recited in claim 15, wherein the dispute related advertising field includes an advertisement that is selected by a computer based system.

17. A method as recited in claim 15, wherein the dispute related advertising field includes an advertisement related to a fact of the dispute.

18. A method as recited in claim 3, further comprising:
determining which people that access the on-line form are permitted to interact therewith based on an assessment of at least one of the person's knowledge of the law and the person's knowledge of the facts, wherein the determining step includes assessing the person's knowledge by providing the person a set of one or more questions and evaluating the person's responses to the questions.

19. A method as recited in claim 18, wherein the determining step is based on an assessment of the person's knowledge of the law.

20. A method as recited in claim 18, wherein the determining step is based on an assessment of the person's knowledge of the facts.

21. A method of resolving a dispute, comprising:
(a) at least one of a plurality of parties to the dispute providing, via an on-line connection, an input relating to the dispute; and
(b) interaction, directed towards resolving the dispute occurring in substantially real-time, between a third party and at least one of the parties to the dispute,
wherein the dispute is resolved based at least in part on the interaction.

22. The method of claim 21 wherein steps (a) and (b) occur at substantially the same time.

23. The method of claim 21 wherein the substantial real-time interaction is displayed on at least a display.

24. A system for fostering the resolution of a dispute, comprising:
a computer adapted to receive from at least one of a plurality of parties to the dispute, via an on-line connection, an input relating to the dispute;
the computer further adapted to receive an interaction directed towards resolving the dispute in substantially real-time between at least one of the parties to the dispute and a third party,
wherein the dispute is resolved based at least in part on the interaction.

* * * * *